US012425487B2

(12) United States Patent
Yamaguchi

(10) Patent No.: US 12,425,487 B2
(45) Date of Patent: Sep. 23, 2025

(54) INFORMATION PROCESSING APPARATUS USING A PROXY SERVER, METHOD FOR CONTROLLING INFORMATION PROCESSING APPARATUS AND STORAGE MEDIUM

(71) Applicant: CANON KABUSHIKI KAISHA, Tokyo (JP)

(72) Inventor: Yoshinori Yamaguchi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/402,885

(22) Filed: Jan. 3, 2024

(65) Prior Publication Data
US 2024/0251023 A1    Jul. 25, 2024

(30) Foreign Application Priority Data
Jan. 24, 2023  (JP) ................................. 2023-008933

(51) Int. Cl.
*G06F 15/16* (2006.01)
*H04L 41/0806* (2022.01)
*H04L 67/56* (2022.01)

(52) U.S. Cl.
CPC .......... *H04L 67/56* (2022.05); *H04L 41/0806* (2013.01)

(58) Field of Classification Search
CPC .............................. H04L 67/56; H04L 41/0806
(Continued)

(56) References Cited

U.S. PATENT DOCUMENTS 6,389,422 B1 * 5/2002 Doi ....................... G06F 16/182
                                                    707/827
7,020,719 B1 * 3/2006 Grove ................. H04L 67/1001
                                                    709/227
(Continued)

FOREIGN PATENT DOCUMENTS

CN        108512929 B     10/2021
JP        2011-154592 A   8/2011

OTHER PUBLICATIONS

"Working with Lotus Notes and the Internet," Lotus Development Corporation, XP001556154, Jan. 1, 1996, pp. 1-292.

(Continued)

Primary Examiner — Alicia Baturay
(74) Attorney, Agent, or Firm — VENABLE LLP

(57) ABSTRACT

An information processing apparatus acquires first setting information including a proxy server setting method enabled in the information processing apparatus, acquires second setting information indicating a proxy server setting method supported by an external apparatus, and determines whether there is a same setting method in the first setting information and the second setting information. In a case there is the same setting method, all information indicating the same setting method is transmitted to the external apparatus, and if there is no same setting method, it is determined whether the proxy server setting method enabled in the information processing apparatus, which is included in the first setting information, can be converted to any one of the second setting information supported by the external apparatus. If it is determined that conversion is possible, information obtained by converting the first setting information to the second setting information is transmitted to the external apparatus.

10 Claims, 15 Drawing Sheets

(58) Field of Classification Search
USPC .......................................................... 709/203
See application file for complete search history.

(56) References Cited

U.S. PATENT DOCUMENTS

| | | | | |
|---|---|---|---|---|
| 7,360,082 | B1* | 4/2008 | Berthold | H04L 9/12 |
| | | | | 713/157 |
| 8,056,125 | B2* | 11/2011 | Hirose | H04L 63/08 |
| | | | | 726/12 |
| 8,171,117 | B2* | 5/2012 | Rhodes | G06Q 10/06 |
| | | | | 709/227 |
| 8,626,853 | B2* | 1/2014 | Piernot | G06F 16/9566 |
| | | | | 709/206 |
| 9,432,420 | B2* | 8/2016 | Nishida | H04L 65/1073 |
| 10,182,167 | B2* | 1/2019 | Takahashi | G06K 15/1805 |
| 10,341,841 | B2* | 7/2019 | Owen | H04L 67/56 |
| 10,616,061 | B2* | 4/2020 | Holley | H04L 12/2805 |
| 10,636,082 | B2* | 4/2020 | Gandevia | G06Q 30/08 |
| 10,848,486 | B2* | 11/2020 | Ozaki | G06V 40/12 |
| 11,025,730 | B1* | 6/2021 | Inoue | H04L 67/56 |
| 11,121,924 | B2* | 9/2021 | Holley | H04L 12/2805 |
| 11,343,185 | B2* | 5/2022 | Vysotsky | H04L 67/141 |
| 12,210,616 | B1* | 1/2025 | Razinskas | G06F 21/554 |
| 2017/0063646 | A1* | 3/2017 | Kawai | G06Q 10/10 |
| 2017/0090830 | A1* | 3/2017 | Tomono | G06F 3/1235 |
| 2020/0374229 | A1 | 11/2020 | Vysotsky et al. | |
| 2022/0038586 | A1* | 2/2022 | Sako | G06F 3/1287 |
| 2023/0362049 | A1* | 11/2023 | Kumahashi | H04L 41/5009 |
| 2024/0040053 | A1* | 2/2024 | Sato | H04N 1/00477 |

OTHER PUBLICATIONS

European Search Report dated Jun. 20, 2024, in related European Patent Application No. 24153322.3.

* cited by examiner

| PROXY SERVER SETTING METHOD FOR INFORMATION PROCESSING APPARATUS | SUPPORT | ENABLED/ DISABLED | ADDITIONAL SETTING ITEM |
|---|---|---|---|
| (1) AUTOMATICALLY DETECT SETTING | Yes | DISABLED | NONE |
| (2) USER AUTOMATIC CONFIGURATION SCRIPT | Yes | ENABLED | SCRIPT ADDRESS URL |
| (3) MANUAL PROXY SERVER SETTING | Yes | DISABLED | PROXY SERVER ADDRESS URL, PORT NUMBER |

FIG.4

| PROXY SERVER SETTING METHOD FOR INFORMATION PROCESSING APPARATUS | SUPPORT | ENABLED/ DISABLED | ADDITIONAL SETTING ITEM |
|---|---|---|---|
| (1) AUTOMATICALLY DETECT SETTING | No | - | NONE |
| (2) USER AUTOMATIC CONFIGURATION SCRIPT | No | - | SCRIPT ADDRESS URL |
| (3) MANUAL PROXY SERVER SETTING | Yes | - | PROXY SERVER ADDRESS URL, PORT NUMBER |

| | CONVERSION DESTINATION (a) | (b) | (c) |
|---|---|---|---|
| CONVERSION SOURCE (1) | - | POSSIBLE: AUTOMATICALLY DETECTED SCRIPT ADDRESS CAN BE SET | POSSIBLE: PROXY SERVER ADDRESS CAN BE ACQUIRED BY ANALYZING AUTOMATICALLY OBTAINED SCRIPT ADDRESS |
| (2) | IMPOSSIBLE: CONVERSION IS NOT POSSIBLE SINCE (a) IS ONLY FOR SETTING ENABLED OR DISABLED | - | POSSIBLE: PROXY SERVER ADDRESS CAN BE ACQUIRED BY ANALYZING SCRIPT ADDRESS |
| (3) | IMPOSSIBLE: CONVERSION IS NOT POSSIBLE SINCE (a) IS ONLY FOR SETTING ENABLED OR DISABLED | IMPOSSIBLE: SCRIPT ADDRESS CANNOT BE OBTAINED FROM PROXY SERVER ADDRESS | - |

| SETTING METHOD CURRENTLY ENABLED IN INFORMATION PROCESSING APPARATUS | SETTING METHOD SUPPORTED BY PRINTING APPARATUS | DETERMINATION RESULT ON SETTING CONVERSION METHOD |
|---|---|---|
| SETTING METHODS (1), (2), AND (3) | NONE | SETTING NOT POSSIBLE FOR PRINTING APPARATUS. DISPLAY WARNING SCREEN 805 |
| SETTING METHODS (2) AND (3) | SETTING METHODS (a) | CONVERTIBLE. CONVERT FROM SETTING METHOD (1) TO (b) |
| SETTING METHODS (1) AND (3) | SETTING METHODS (b) | CONVERTIBLE. CONVERT FROM SETTING METHOD (1) TO (c) |
| SETTING METHODS (1) AND (2) | SETTING METHODS (c) | CONVERTIBLE. CONVERT FROM SETTING METHOD (1) TO (c) |
| SETTING METHODS (1) | SETTING METHODS (b) AND (c) | CONVERTIBLE. CONVERT FROM SETTING METHOD (1) TO (c) |
| SETTING METHODS (2) | SETTING METHODS (a) AND (c) | CONVERTIBLE. CONVERT FROM SETTING METHOD (2) TO (c) |
| SETTING METHODS (3) | SETTING METHODS (a) AND (b) | DISPLAY SETTINGS SCREEN 803 |
| SETTING METHODS (1) | SETTING METHODS (b) | CONVERTIBLE. CONVERT FROM SETTING METHOD (1) TO (b) |
| SETTING METHODS (1) | SETTING METHODS (c) | CONVERTIBLE. CONVERT FROM SETTING METHOD (1) TO (c) |
| SETTING METHODS (2) | SETTING METHODS (a) | INCONVERTIBLE. DISPLAY SETTINGS SCREEN 801 |
| SETTING METHODS (2) | SETTING METHODS (c) | CONVERTIBLE. CONVERT FROM SETTING METHOD (2) TO (c) |
| SETTING METHODS (3) | SETTING METHODS (a) | INCONVERTIBLE. DISPLAY SETTINGS SCREEN 801 |
| SETTING METHODS (3) | SETTING METHODS (b) | INCONVERTIBLE. DISPLAY SETTINGS SCREEN 802 |
| NONE | SETTING METHODS (a), (b), AND (c) | INCONVERTIBLE. DISPLAY SETTINGS SCREEN 804 |

FIG.7

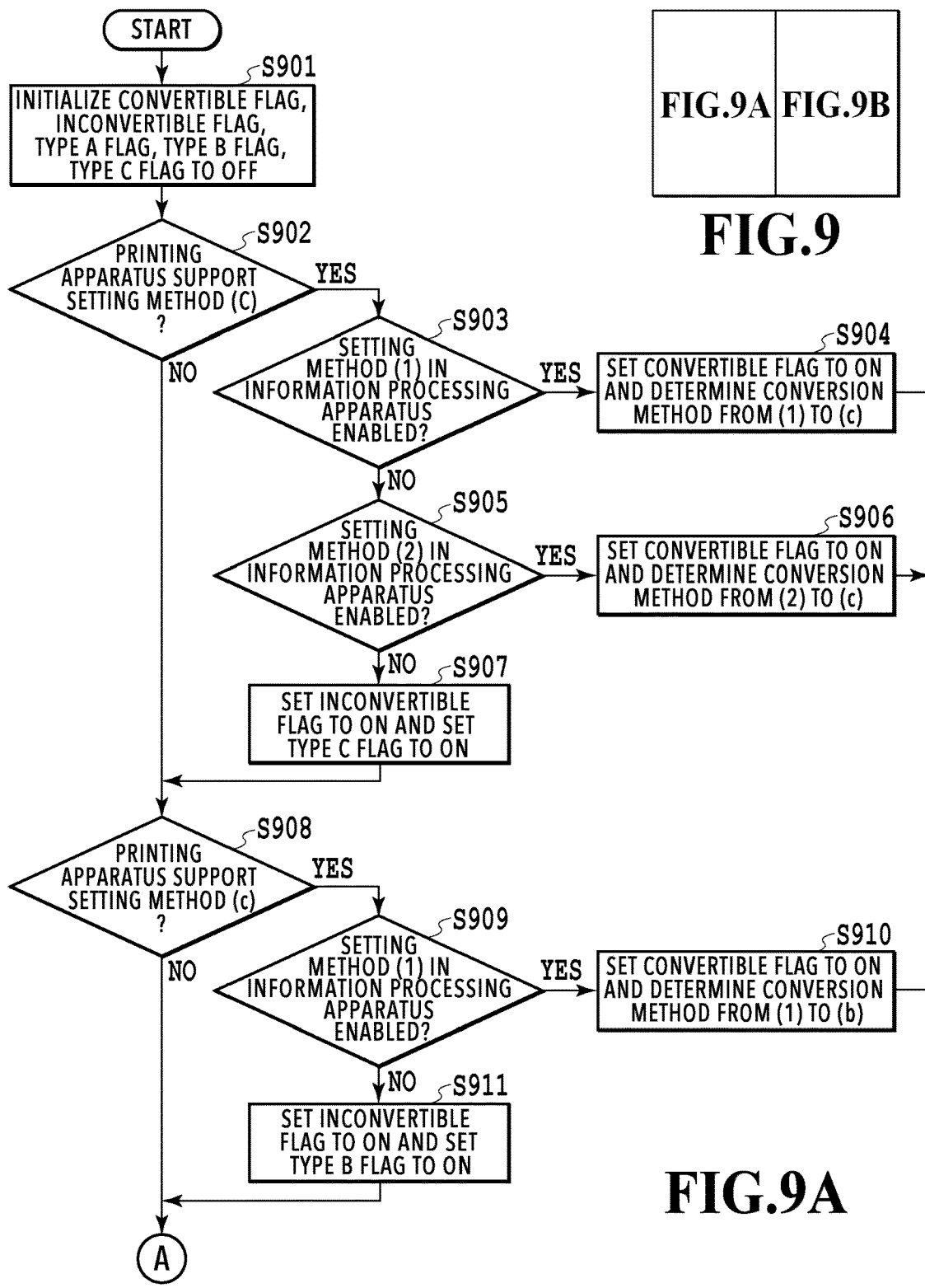

1101

| SELECT PRINTER |  |
|---|---|
| SELECT ONE PRINTER TO BE SET AND CLICK OK | |

| PRODUCT NAME | SERIAL NUMBER |
|---|---|
| ○ KX999 | ***23456 |
| ● KX888 | ***12345 |
| ○ TS9999 | ***54321 |

| SUBSCRIPTION FUNCTION SUPPORTED? | INITIALIZATION INCOMPLETE? | PROXY SERVER SETTING NECESSARY? |
|---|---|---|
| TRUE | FALSE | FALSE |

INFORMATION PROCESSING APPARATUS USING A PROXY SERVER, METHOD FOR CONTROLLING INFORMATION PROCESSING APPARATUS AND STORAGE MEDIUM

BACKGROUND

Field of the Invention

The present disclosure relates to a technique for setting proxy server information.

Description of the Related Art

It is recently becoming more common for a printing apparatus itself to realize various functions by connecting to the Internet. The printing apparatus may have to go through a proxy server to access the Internet. In this case, it is necessary to properly set proxy server information in the printing apparatus.

As a method for setting such proxy server information, there is a method wherein a URL or port number, which is proxy server information, is inputted from an operation panel of the printing apparatus. Japanese Patent Laid-Open No. 2011-154592 proposes a technique for setting proxy server information in a printing apparatus using a control device.

SUMMARY

There is a demand for a further technique for facilitating proxy server settings.

An information processing apparatus according to an aspect of the present disclosure includes: a first acquisition unit that acquires first setting information including at least one piece of information indicating a proxy server setting method enabled in the information processing apparatus; a second acquisition unit that acquires second setting information including at least one piece of information indicating a proxy server setting method supported by an external apparatus; and a transmission unit that transmits, in a case where there is a same setting method in the first setting information and the second setting information, all information indicating the same setting method to the external apparatus.

Further features of the present invention will become apparent from the following description of exemplary embodiments with reference to the attached drawings.

BRIEF DESCRIPTION OF THE DRAWINGS

FIG. 4 shows an example showing a proxy server setting method that is enabled in an information processing apparatus;

FIG. 5 shows an example of a proxy server setting method supported by a printing apparatus;

FIG. 6 is a table showing possibilities of converting the proxy server setting methods;

FIG. 7 is a diagram for determining a conversion method based on a combination of the proxy server setting methods;

FIG. 9 is a diagram showing the relationship of FIGS. 9A and 9B;

FIGS. 9A and 9B are flowcharts for determining a proxy server setting method;

FIG. 11 shows a screen for selecting a printing apparatus to be set;

FIG. 14 is a diagram showing function flags returned to the information processing apparatus by the printing apparatus.

DESCRIPTION OF THE EMBODIMENTS

Hereinafter, the present embodiment will be described with reference to the accompanying drawings. Note that configurations described in the following embodiments are merely examples, and the present disclosure is not limited to the illustrated configurations.

Embodiment 1

Figure 1:
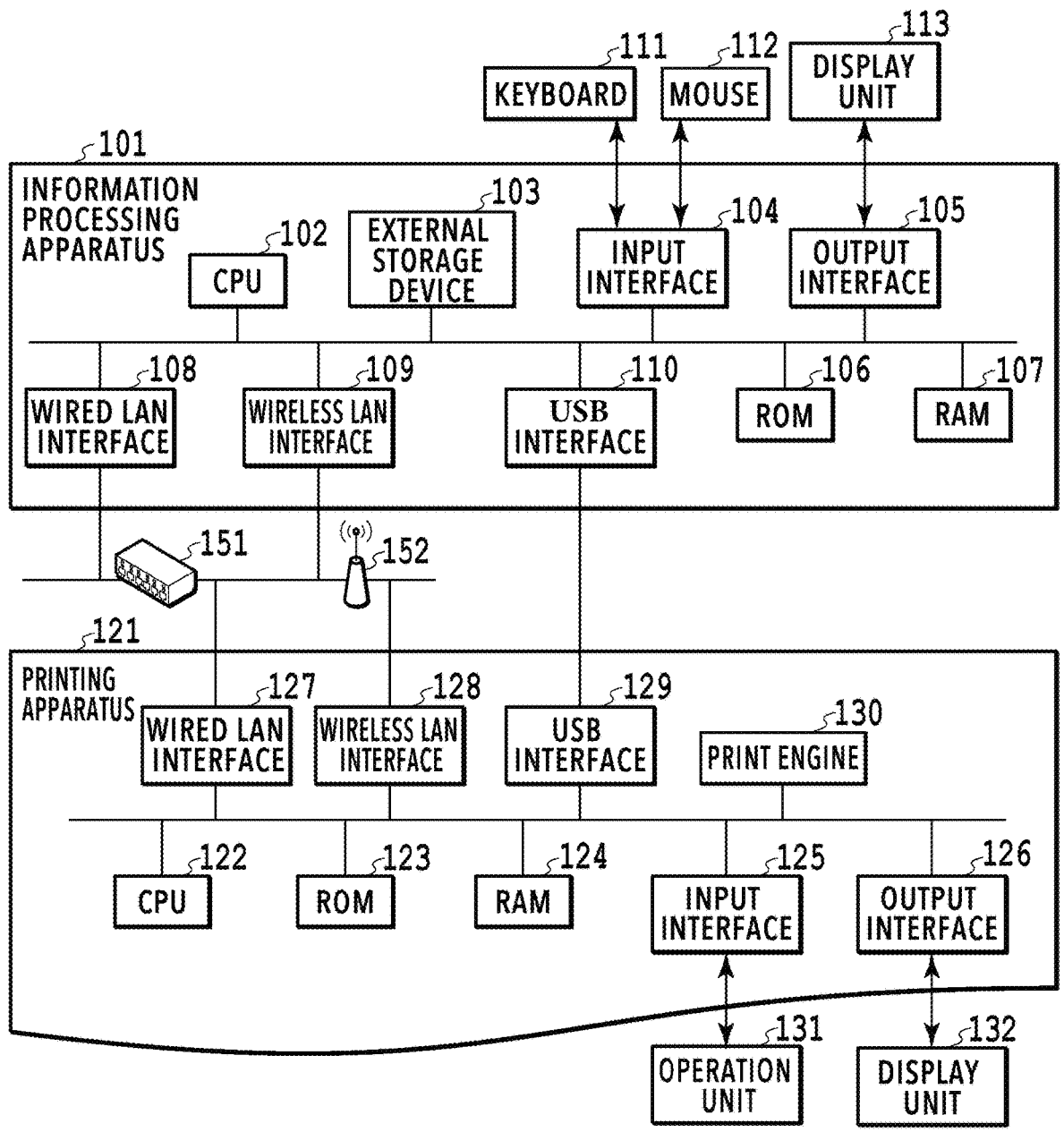
FIG. 1 is an overall configuration diagram of a system.

FIG. 1 is an overall configuration diagram of a system representing the present embodiment. An information processing apparatus 101 includes a CPU 102, an external storage device 103, an input interface 104, and an output interface 105. The information processing apparatus 101 also includes a ROM 106, a RAM 107, a wired LAN interface 108, a wireless LAN interface 109, and a USB interface 110. A keyboard 111 and a mouse 112 are connected to the input interface 104, and a display unit 113 is connected to the output interface 105.

A printing apparatus 121 includes a CPU 122, a ROM 123, a RAM 124, an input interface 125, an output interface 126, and a wired LAN interface 127. The printing apparatus 121 also includes a wireless LAN interface 128, a USB interface 129, and a print engine 130. An operation unit 131 is connected to the input interface 125, and a display unit 132 is connected to the output interface 126.

The information processing apparatus 101 and the printing apparatus 121 can communicate with each other by connecting through their interfaces. The USB interface 110 of the information processing apparatus 101 and the USB interface 129 of the printing apparatus 121 are representative examples of such interfaces. In this case, the USB interfaces are directly connected to each other through a USB cable. In a case of connecting the wired LAN interface 108 of the information processing apparatus 101 to the wired LAN interface 127 of the printing apparatus 121, the wired LAN interfaces are connected to each other through a router 151.

In a case of connecting the wireless LAN interface 109 of the information processing apparatus 101 to the wireless LAN interface 128 of the printing apparatus 121, the wireless LAN interfaces are connected to each other through a wireless LAN access point 152. In a case where the router 151 and the wireless LAN access point 152 are on the same network, communication between the wired LAN and the wireless LAN is also possible. That is, it becomes possible to connect the wired LAN interface 108 of the information processing apparatus 101 to the wireless LAN interface 128 of the printing apparatus, or to connect the wireless LAN interface 109 of the information processing apparatus 101 to the wired LAN interface 127 of the printing apparatus 121. Note that the router 151 or the wireless LAN access point 152 is connected to the Internet. That is, the information processing apparatus 101 or the printing apparatus 121 can access the Internet through their wired LAN interface or wireless LAN interface.

In a case where the printing apparatus 121 is in an access point mode to serve as the wireless LAN access point 152, it is also possible to directly connect the wireless LAN interface 109 of the information processing apparatus 101 to the wireless LAN interface 128 of the printing apparatus 121. Note that the access point mode is used to initialize the wireless LAN interface 128 at a time, typically, at the time of purchase of the printing apparatus 121. The access point mode is also used for a temporary purpose of connecting the information processing apparatus 101 to the printing apparatus 121 without using the wireless LAN access point 152 to perform printing or the like. Depending on the function of the printing apparatus 121, the printing apparatus 121 cannot connect to the Internet during the access point mode. In this case, the printing apparatus 121 operates to restore the connection to the Internet by terminating the access point mode.

Figure 2:
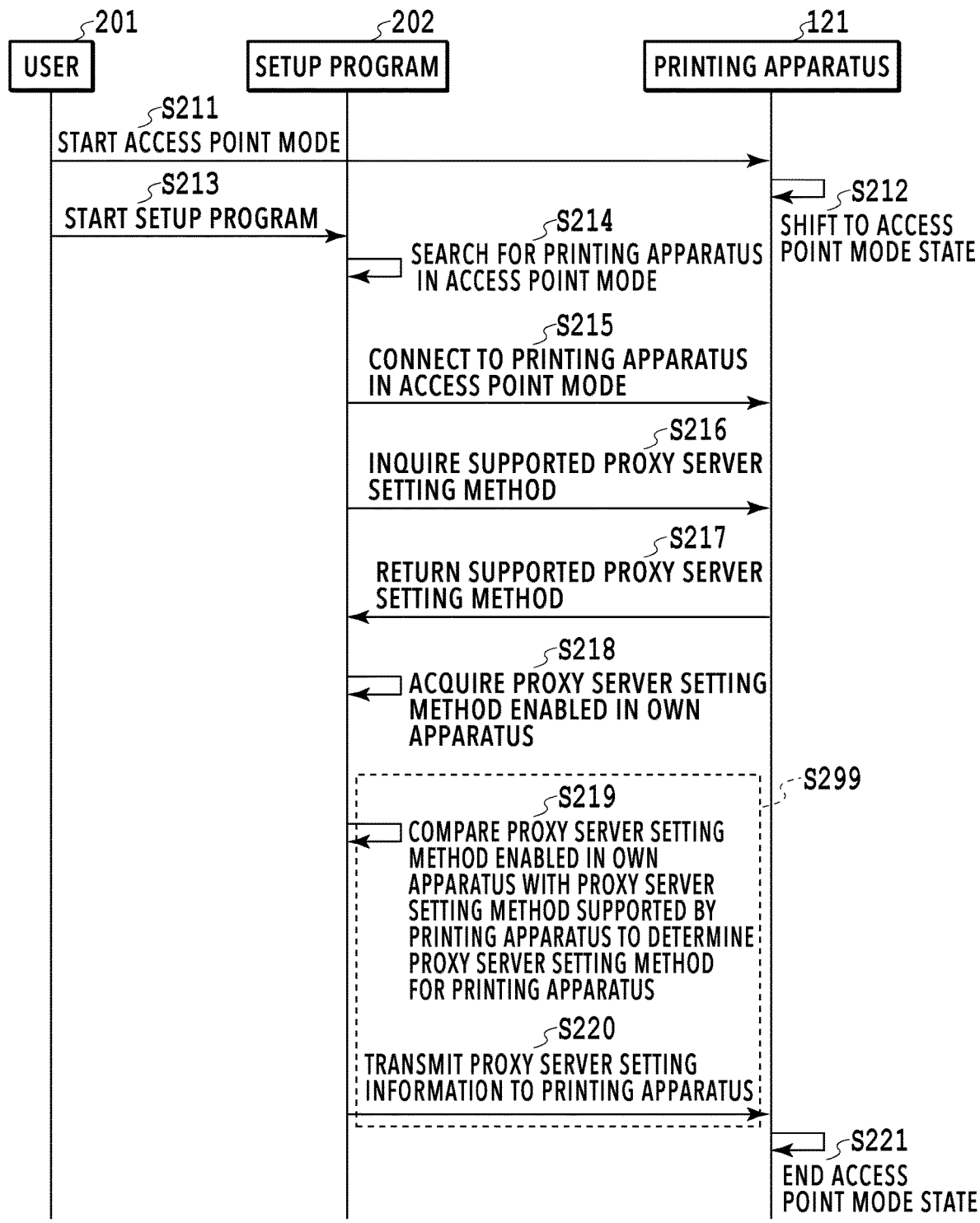
FIG. 2 is a sequence diagram of proxy server settings.

FIG. 2 is a sequence diagram according to the present embodiment. A processing flow according to the present embodiment will be described below with reference to FIG. 2. A proxy server setting method of the related art requires a user to manually input proxy server information such as a URL or port number to an operation panel of the printing apparatus 121. This may cause a setting error due to an erroneous operation. In proxy server settings for the printing apparatus 121 described in the present embodiment, a setup program 202 included in the information processing apparatus 101 acquires a proxy server setting method that is enabled or supported by the information processing apparatus 101 and the printing apparatus 121. Based on this information, a proxy server setting method to be set in the printing apparatus 121 is then determined, and the determined setting method is transmitted to the printing apparatus 121. This can reduce the chances of manual operations by the user, thus expecting to reduce the setting errors. This will be explained in detail below.

In the present embodiment, the information processing apparatus 101 and the printing apparatus 121 are connected in such a manner that their wireless LAN interfaces 109 and 128 directly communicate with each other using the access point mode function of the printing apparatus 121. In the following description of each process, "S" means a step in the sequence diagram. The same applies to subsequent sequence diagrams or flowcharts.

First, in S211, a user 201 operates the operation unit 131 of the printing apparatus 121 to instruct the printing apparatus 121 to start the access point mode. In S212, upon receiving the instruction, the printing apparatus 121 shifts to its own access point mode.

Next, in S213, the user 201 instructs to start the setup program 202 through the input interface 104 such as the keyboard 111 or the mouse 112 of the information processing apparatus 101. The setup program 202 is read into the RAM 107 from the ROM 106 or the external storage device 103 by the CPU 102.

In S214, the setup program 202 searches for the printing apparatus 121 in the access point mode. If the printing apparatus is detected, the setup program 202 connects to the printing apparatus 121 in the access point mode in S215. Upon completing the connection, the setup program 202 inquires of the printing apparatus 121 about a proxy server setting method supported by the printing apparatus 121 in S216. In S217, the printing apparatus 121 returns the proxy server setting method supported by the printing apparatus 121 to the setup program 202.

In S218, the setup program 202 acquires the proxy server setting method currently enabled in the information processing apparatus 101. Then, in S219, the setup program 202 determines a proxy server setting method for the printing apparatus 121, based on the proxy server setting method currently enabled in the information processing apparatus 101 and the proxy server setting method supported by the printing apparatus 121. The proxy server setting methods will be described in detail later. In S220, the setup program 202 transmits the determined proxy server setting method to the printing apparatus 121. In S221, upon receiving the proxy server settings, the printing apparatus 121 ends the access point mode and shifts to an idle state. Thereafter, the printing apparatus 121 configures proxy server settings using the received proxy server setting method. S219 and S220 are collectively referred to as S299, which will be described in detail below.

Figure 3:
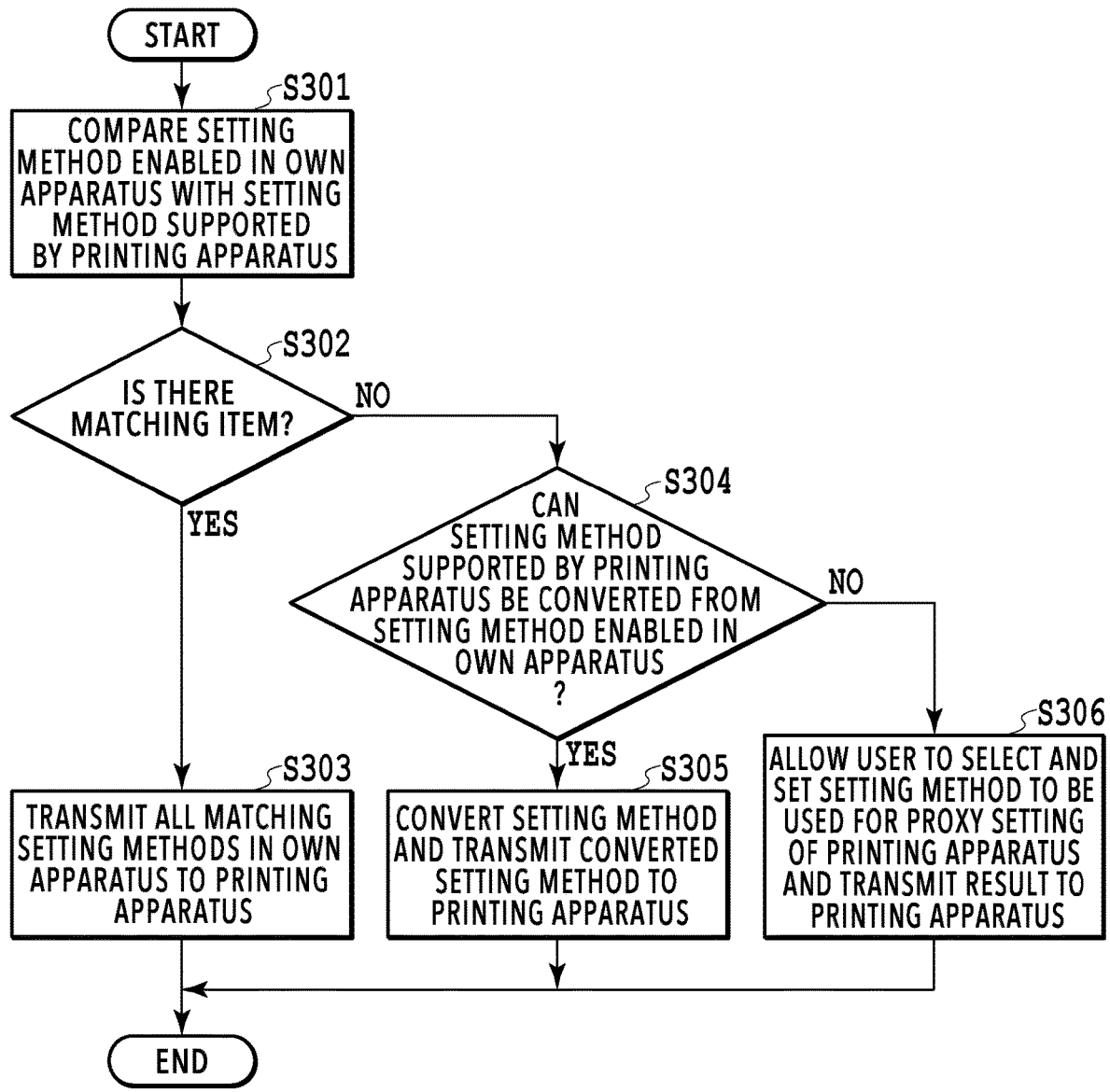
FIG. 3 is a flowchart for determining a proxy server setting method.

FIG. 3 is a flowchart showing details of the processing of S299 in the sequence diagram shown in FIG. 2. More specifically, this flowchart illustrates a process to determine a proxy server setting method performed by the printing apparatus 121, based on the proxy server setting method enabled in the information processing apparatus 101 and the proxy server setting method supported by the printing apparatus 121.

First, in S301, the setup program 202 compares the proxy server setting method currently enabled in the information processing apparatus 101 with the proxy server setting method supported by the printing apparatus 121. FIG. 4 shows an example of the proxy server setting method currently enabled in the information processing apparatus 101.

FIG. 4 is a diagram showing the proxy server setting method currently enabled in the information processing apparatus 101, which is acquired from the information processing apparatus 101 by the setup program 202. As shown in a table 401, the proxy server setting method currently enabled in the information processing apparatus 101 is "(1) Use automatic configuration script", while "(2) Automatically detect settings" and "(3) Proxy server manual setting" are disabled. Note that the proxy server setting methods described above can be set to "enabled" or "disabled" as desired by the user's operation.

On the other hand, FIG. 5 shows an example of proxy server settings supported by the printing apparatus 121.

FIG. 5 is a diagram showing a table of proxy server setting methods supported by the printing apparatus 121, which are acquired from the printing apparatus 121 by the setup program 202. A table 501 shows that the proxy server setting method supported by the printing apparatus 121 is "(c) Proxy server manual setting", while "(a) Automatically detect settings" and "(b) Use automatic configuration script" are not supported. To indicate that the method is not supported, a method of not returning the corresponding support item itself may be used.

In S302, the setup program 202 determines whether or not there is a setting method that matches the proxy server setting method currently enabled in the information processing apparatus 101 and the proxy server setting method supported by the printing apparatus 121. If there is a matching setting method, the setup program 202 advances to S303. On the other hand, if there is no matching setting method, the setup program 202 advances to S304. In S303, the setup program 202 determines that the matching proxy server setting methods are applicable to the printing apparatus 121 and transmits all the matching proxy server setting methods to the printing apparatus 121. Thereafter, the setup program 202 ends the processing of this flowchart.

In S304, since there is no matching proxy server setting method, the setup program 202 determines whether it is possible to convert the proxy server setting method currently enabled in the information processing apparatus 101 to the proxy server setting method supported by the printing apparatus 121.

FIG. 6 is a diagram showing the possibilities of converting the proxy server setting method. This conversion possibility indicates the possibilities of conversion assuming that the proxy server setting method enabled in the information processing apparatus 101 is the conversion source and the proxy server setting method supported by the printing apparatus 121 is the conversion destination. In S304, the setup program 202 compares each item of the proxy server setting method currently enabled in the information processing apparatus 101 with each item of the proxy server setting method supported by the printing apparatus 121 one by one.

For example, a case is considered where the setting method enabled in the information processing apparatus 101, which is the conversion source, is "(1) Use automatic configuration script". "(1) Use automatic configuration script" is a setting method that is not supported by the printing apparatus 121, which therefore needs to be converted to a setting method supported by the printing apparatus 121. In this event, the information processing apparatus 101 refers to a table 601 in FIG. 6. As shown in the table 601, if "(1) Use automatic configuration script" is the conversion source, the conversion destination setting method supported by the printing apparatus 121 is "(c) Proxy server manual setting". This is because a proxy server address can be acquired by analyzing a script address obtained by using the automatic configuration script, thus enabling the conversion of the settings. If it is determined that there is at least one combination for which conversion is "possible", the process advances to S305. On the other hand, if it is determined that there is no combination for which conversion is "possible", the process advances to S306.

In S305, the setup program 202 performs processing of converting the setting method determined to be convertible. That is, the proxy server setting method currently enabled in the information processing apparatus 101 is converted to the proxy server setting method supported by the printing apparatus 121. Then, the converted setting method is transmitted to the printing apparatus 121. In the case of the present embodiment, as shown in the table 601 of FIG. 6, the applicable conversion method is "from setting method (1) to (c)", "from setting method (2) to (c)" or "from setting method (1) to (b)". After transmitting the setting method to the printing apparatus 121, the setup program 202 ends the processing of this flowchart.

In S306, the setup program 202 allows the user to select or set a setting method to be used for setting the proxy server of the printing apparatus 121, since there is no setting method of a convertible combination. Then, the setting method selected or set by the user is transmitted to the printing apparatus 121. The setup program 202 then ends the processing of this flowchart. The above is the processing executed in S299 of FIG. 2. By applying this processing, if there is a proxy server setting method that matches both the information processing apparatus 101 and the printing apparatus 121, as in S301 to S303, for example, the information processing apparatus 101 transmits the matching setting method to the printing apparatus 121. This can save the user's effort in operation. Even in a case where there is no matching setting method after S304, processing is performed to reduce the chance of the user manually inputting the proxy server settings.

Hereinafter, detailed description is given of the processing performed after S304 in a case where the determination result is NO in S302 of FIG. 3. Specifically, detailed description is given of the processing of converting the proxy server setting method if there is no matching proxy server setting method for the information processing apparatus 101 and the printing apparatus 121. Converting the setting method means converting the proxy server setting method that is enabled in the information processing apparatus 101 to the proxy server setting method supported by the printing apparatus 121. In the following description, processing of displaying a settings screen in a case where the conversion of the setting method cannot be executed will also be described.

In the following description, the proxy server setting methods supported by the information processing apparatus 101 are setting method (1), setting method (2), and setting method (3). As shown in FIG. 4, setting method (1) is "Automatically detect settings", setting method (2) is "Use automatic configuration script", and setting method (3) is "Proxy server manual setting".

The proxy server setting methods supported by the printing apparatus 121 are setting method (a), setting method (b), and setting method (c). As shown in FIG. 5, setting method (a) is "Automatically detect settings", setting method (b) is "Use automatic configuration script", and setting method (c) is "Proxy server manual setting".

Figure 9B:
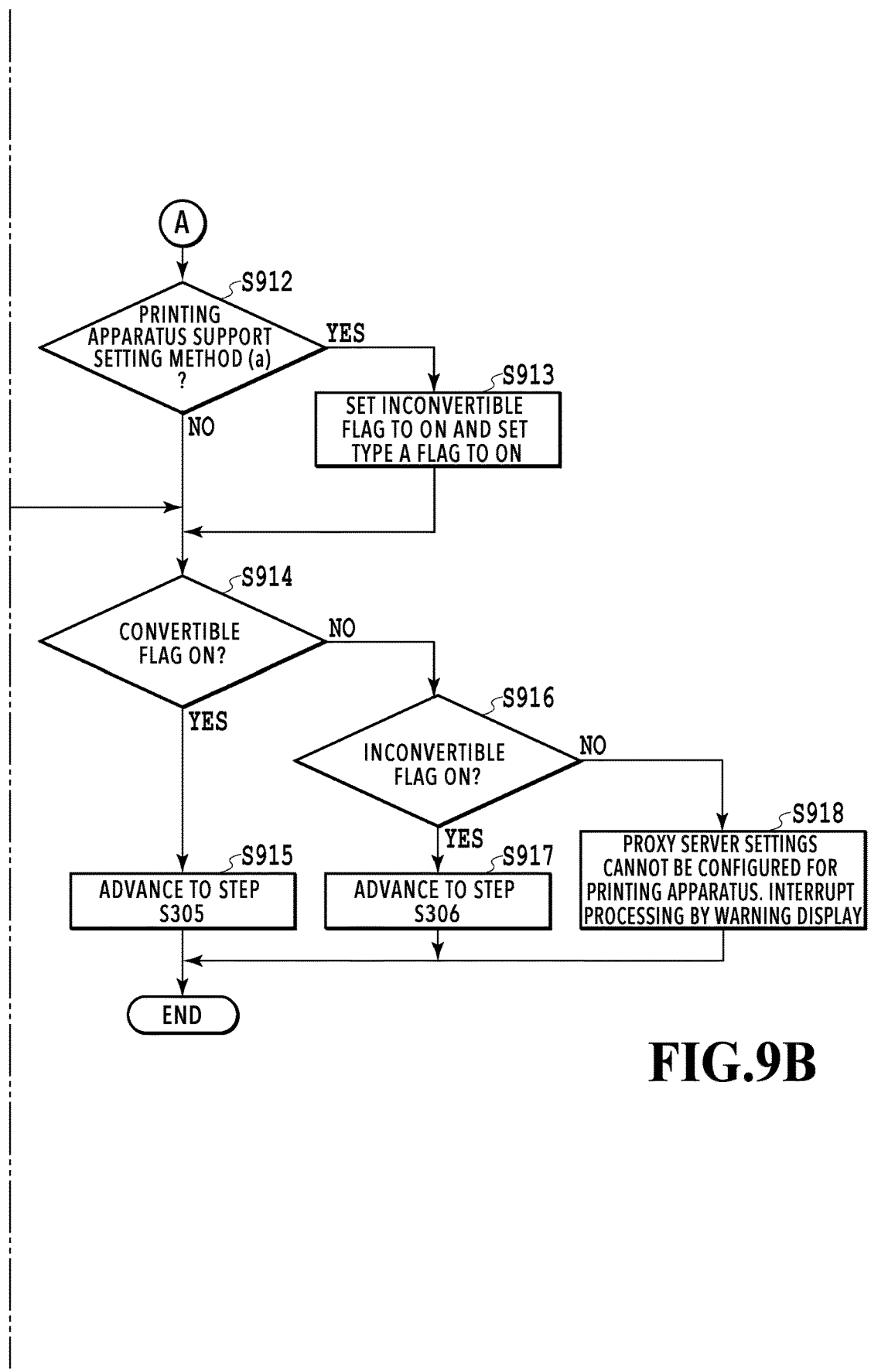

FIGS. 9A and 9B are flowcharts for explaining details of the determination process in S304 of FIG. 3. In this flowchart, a plurality of types of flags are switched according to the proxy server setting method enabled in the information processing apparatus 101 or the proxy server setting method supported by the printing apparatus 121, and processing to be executed is determined according to the switched flag. There are five flags used: a convertible flag, an inconvertible flag, Type A flag, Type B flag, and Type C flag. The convertible flag is a flag indicating that it is possible to convert the proxy server setting method enabled in the information processing apparatus 101 to the setting method supported by the printing apparatus 121. The inconvertible flag is a flag indicating that it is not possible to convert the proxy server setting method enabled in the information processing apparatus 101 to the setting method supported by the printing apparatus 121. Type A flag, Type B flag, and Type C flag are flags used to display a settings screen on the information processing apparatus 101 if it is determined that the proxy server setting method is inconvertible. That is, Type A flag, Type B flag, and Type C flag are used in a case where the inconvertible flag is ON. With reference to the flowchart of FIG. 9, description is given later of what kind of settings screen is to be displayed depending on the state of each of Type A flag, Type B flag, and Type C flag.

First, in S901, the setup program 202 initializes the convertible flag, inconvertible flag, Type A flag, Type B flag, and Type C flag to OFF. In S902, the setup program 202 determines whether or not the printing apparatus 121 supports the proxy server setting method (c). If it is determined that the setting method is supported, the setup program 202 advances to S903. On the other hand, if it is determined that the setting method is not supported, the process advances to S908.

In S903, the setup program 202 determines whether or not the proxy server setting method (1) is currently enabled in the information processing apparatus 101. If it is determined that the setting method is enabled, the setup program 202 advances to S904. On the other hand, if it is determined that the setting method is not enabled, the process advances to S905. In S904, the setup program 202 sets the convertible flag to ON, stores in the RAM 107 of the information processing apparatus 101 that the conversion method has been determined from setting method (1) to setting method (c), and then advances to S914. In S905, the setup program 202 determines whether or not the proxy server setting method (2) is currently enabled in the information processing apparatus 101. The setup program 202 advances to S906 if it is determined that the setting method is enabled, and advances to S907 if it is determined that the setting method is not enabled. In S906, the setup program 202 sets the convertible flag to ON, stores in the RAM 107 of the information processing apparatus 101 that the conversion method has been determined from setting method (2) to setting method (c), and then advances to S914. In S907, the setup program 202 sets the inconvertible flag and Type C flag to ON and then advances to S908.

Next, in S908, the setup program 202 determines whether or not the printing apparatus 121 supports the proxy server setting method (b). If it is determined that the setting method is supported, the setup program 202 advances to S909. On the other hand, if it is determined that the setting method is not supported, the setup program 202 advances to S912. In S909, the setup program 202 determines whether or not the proxy server setting method (1) is currently enabled in the information processing apparatus 101. If it is determined that the setting method is enabled, the setup program 202 advances to S910. On the other hand, if it is determined that the setting method is not enabled, the setup program 202 advances to S911. In S910, the setup program 202 sets the convertible flag to ON, stores in the RAM 107 of the information processing apparatus 101 that the conversion method has been determined from setting method (1) to setting method (b), and then advances to S914. In S911, the setup program 202 sets the inconvertible flag and Type B flag to ON and then advances to S912.

Thereafter, in S912, the setup program 202 determines whether or not the printing apparatus 121 supports the proxy server setting method (a). The setup program 202 advances to S913 if it is determined that the setting method is supported, and advances to S914 if it is determined that the setting method is not supported. In S913, the setup program 202 sets the inconvertible flag and Type A flag to ON and then advances to S914.

Figure 8:
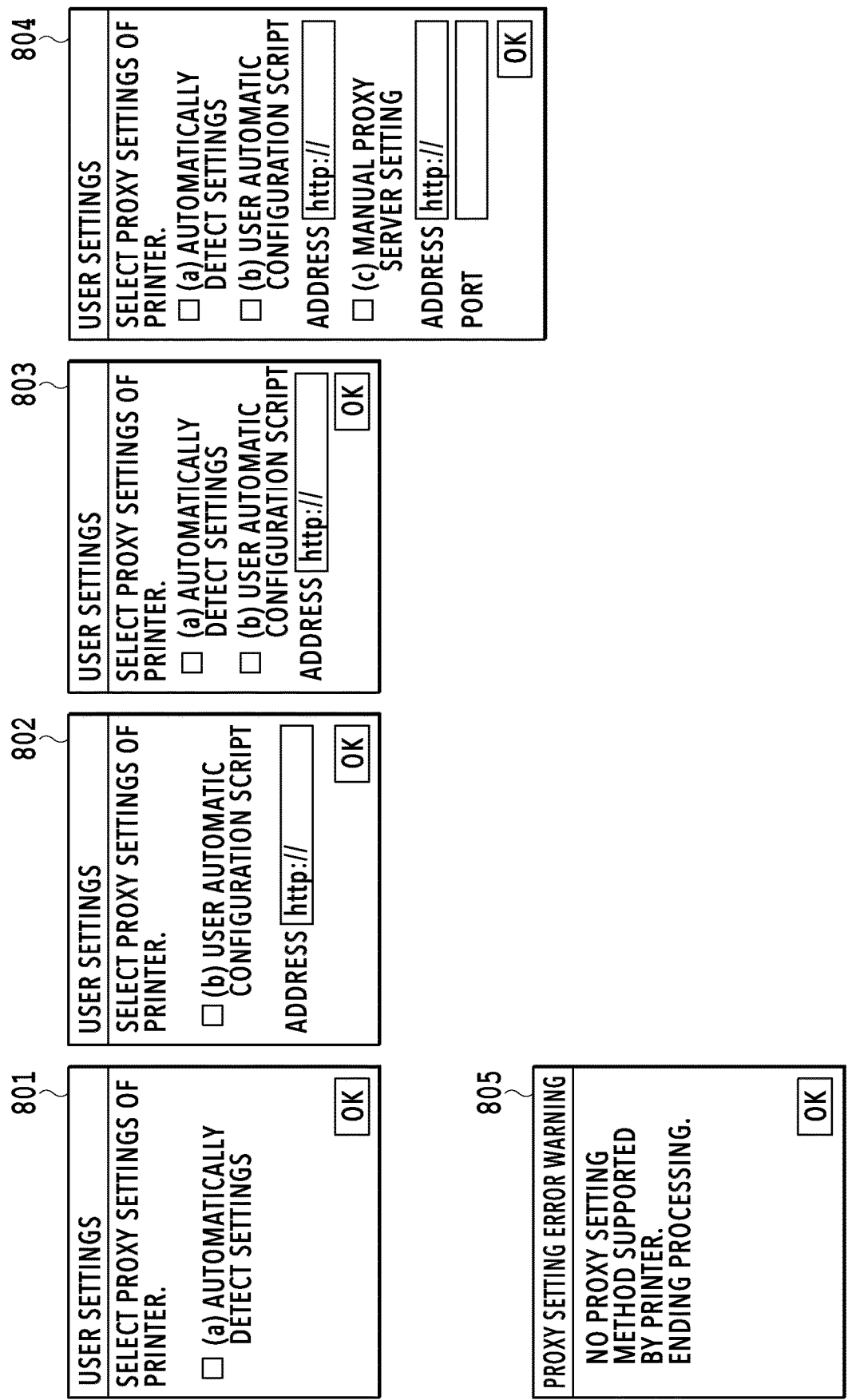
FIG. 8 is a diagram showing a settings screen and a warning screen for the proxy server setting method.

Subsequently, in S914, the setup program 202 determines whether or not the convertible flag is ON. If the convertible flag is ON, the setup program 202 advances to S915 and executes the processing of S305 in FIG. 3. On the other hand, if the convertible flag is OFF, the setup program 202 advances to S916. In S916, the setup program 202 determines whether or not the inconvertible flag is ON. If the inconvertible flag is ON, the setup program 202 advances to S917 and executes the processing of S306 in FIG. 3. On the other hand, if the inconvertible flag is OFF, the setup program 202 advances to S918, displays a warning screen indicating that the printing apparatus has no proxy server setting method, and then interrupts the processing. Reference numeral 805 in FIG. 8 represents the warning screen. The settings screen and warning screen shown in FIG. 8 will be described later. The above is the detailed description of S304 with reference to the flowchart shown in FIG. 9.

FIG. 7 is a diagram showing what kind of conversion method is obtained by combining the proxy server setting method currently enabled in the information processing apparatus 101 and the proxy server setting method supported by the printing apparatus 121. A table 701 in FIG. 7 shows combinations of the setting methods (setting methods (1), (2), and (3)) enabled in the information processing apparatus and the setting methods (setting methods (a), (b), and (c)) supported by the printing apparatus 121 in the present embodiment. The information processing apparatus 101 stores this table 701 in the ROM 102 or the like and reads the table in a case of converting the setting method, thus making it possible to use the table to determine the conversion of the setting method.

FIG. 8 is a diagram showing a state where the information processing apparatus 101 controls the display unit 113 of the information processing apparatus 101 to display settings screens corresponding to the determination results of the setting conversion methods shown in the table 701 of FIG. 7. FIG. 8 shows four settings screens (settings screens 801 to 804) and a warning screen 805. These settings screens and warning screen are displayed on the information processing apparatus 101 according to the determination result of the setting method corresponding to the combination of the setting method enabled in the information processing apparatus and the setting method supported by the printing apparatus 121. More specifically, the information processing apparatus 101 displays the settings screen or warning screen according to the type of flag set to ON by the flag switching process shown in FIG. 9 (detailed process of S304 shown in FIG. 3) and the determination result of the setting method shown in the table 701 of FIG. 7.

For example, a case is considered where the setting method enabled in the information processing apparatus is "(3) Automatic proxy server setting" and the setting method supported by the printing apparatus 121 is "(a) Automatically detect settings". In this case, the inconvertible flag and Type A flag are ON in S913 of FIG. 9, resulting in NO in the determination of S304, and the setup program 202 advances to S306. The settings screen to be displayed on the information processing apparatus 101 for the user to configure proxy server settings in S306 is determined by referring to the table 701 shown in FIG. 7. According to the table 701, the determination result of the setting conversion method is "Inconvertible. Display settings screen 801" in a case where the setting method enabled in the information processing apparatus is "(3) Automatic proxy server setting" and the setting method supported by the printing apparatus 121 is "(a) Automatically detect settings". Therefore, the setup program 202 displays the settings screen 801 on the display unit 113.

Similarly, a case is considered, for example, where the setting methods enabled in the information processing apparatus are the setting methods (1), (2), and (3), and there is no setting method supported by the printing apparatus 121 (setting methods (a), (b), and (c) are not supported). In this case, the process reaches S918 in the flowchart of FIG. 9. That is, the setup program 202 displays a warning that the proxy server cannot be set. Here, referring to the table 701 shown in FIG. 7, the setting methods enabled in the information processing apparatus 101 are the setting methods (1), (2), and (3), and there is no setting method supported by the printing apparatus 121. In this case, the determination result is "Setting impossible. Display warning screen 805". The information processing apparatus 101 thus displays the warning screen 805 shown in FIG. 8. The information processing apparatus 101 similarly executes the processing for proxy server settings in other cases as well based on the flowchart of FIG. 9 and the table 701 of FIG. 7.

The user detects input to the input interface 104 through the keyboard 111 or mouse 112 of the information processing apparatus 101 for each of the settings screens 801 to 804. Then, the proxy server setting method supported by the printing apparatus 121, which is created based on the input result, is transmitted to the printing apparatus 121.

As described above, according to the present embodiment, the proxy server settings can be easily configured. Specifically, in a case of performing processing for initialization of the wireless LAN interface 128 at the time of purchase of the printing apparatus 121 or the like, the settings of proxy server information of the information processing apparatus 101 can be transmitted to the printing apparatus 121. This can automate the work of setting proxy server information on the printing apparatus 121, which has heretofore been done manually by the user, thus reducing setting errors.

Embodiment 2

In the present embodiment, processing is started with the information processing apparatus 101 and the printing apparatus 121 already in a communicable state on the network. That is, the information processing apparatus 101 and the printing apparatus 121 are connected to the router 151 or wireless LAN access point 152 through their respective wired LAN interfaces or wireless LAN interfaces.

Figure 10:
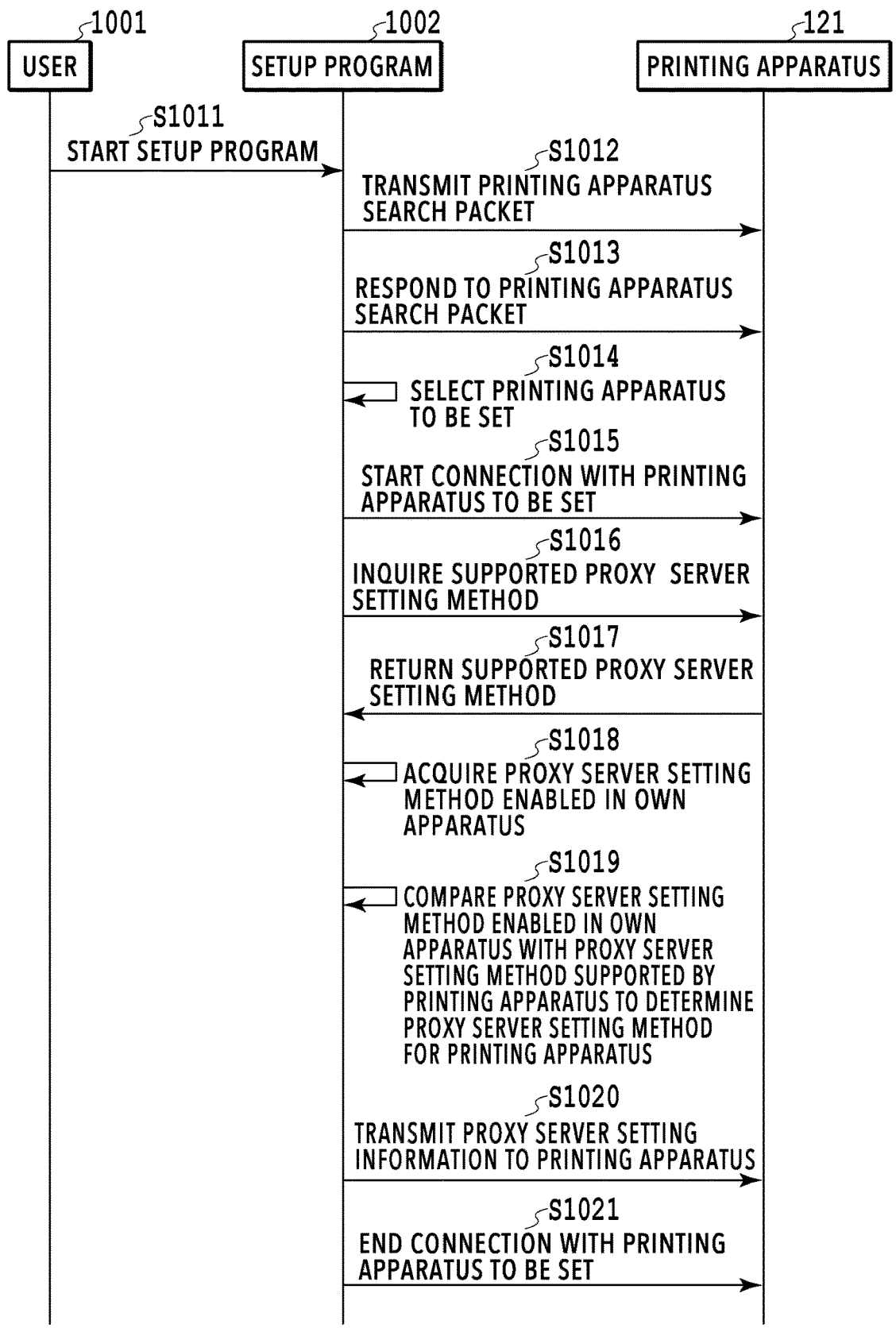
FIG. 10 is a sequence diagram of proxy server settings.

FIG. 10 is a sequence diagram according to the present embodiment. A processing flow according to the present embodiment will be described below with reference to FIG. 10. As described above, in the present embodiment, the information processing apparatus 101 and the printing apparatus 121 are connected in such a manner that their wired LAN interfaces communicate with each other through a wired LAN connected via the router 151. Alternatively, their wireless LAN interfaces may communicate with each other in an infrastructure mode of the wireless LAN connected via the wireless LAN access point 152. As long as the router 151 and the wireless LAN access point 152 are connected to the same network, the wired LAN interface 108 of the information processing apparatus 101 and the wireless LAN interface 128 of the printing apparatus 121 may communicate with each other. It is also possible for the wireless LAN interface 109 of the information processing apparatus 101 and the wired LAN interface 127 of the printing apparatus 121 to communicate with each other.

First, in S1011, the user instructs to start a setup program 1002 through the input interface 104 such as the keyboard 111 or mouse 112 of the information processing apparatus 101. The setup program 1002 is thus read into the RAM 107 from the ROM 106 or the external storage device 103 by the CPU 102.

In S1012, the setup program 1002 transmits a search packet to search for a printing apparatus 121 on the network. If there is the printing apparatus 121 on the network, the printing apparatus 121 returns a response packet to the search packet in S1013. In S1014, the setup program 1002 displays a screen for selecting a printing apparatus to be set from among all the printing apparatuses 121 that have responded, since the number of printing apparatuses that respond is not limited to one.

FIG. 11 is a diagram showing a screen for selecting a printing apparatus to be set. In the present embodiment, the product name and serial number of the printing apparatus to be set are displayed on a printer selection screen 1101, and the user can select any printing apparatus by clicking or the like.

In S1015, upon detecting that the printing apparatus 121 has been selected from the options, the setup program 1002 starts a connection with the selected printing apparatus 121. Once the connection is completed, the setup program 1002 inquires of the printing apparatus 121 in S1016 about a proxy server setting method supported by the printing apparatus 121. In S1017, the printing apparatus 121 returns the proxy server setting method supported by the printing apparatus 121 to the setup program 1002.

In S1018, the setup program 1002 acquires a proxy server setting method currently enabled in the information processing apparatus 101. In S1019, the setup program 1002 compares the proxy server setting method currently enabled in the information processing apparatus 101 with the proxy server setting method supported by the printing apparatus 121. The proxy server setting method for the printing apparatus 121 is then determined. In S1020, the setup program 1002 transmits the determined proxy server setting method to the printing apparatus 121. In S1021, the setup program 1002 performs processing for terminating the connection with the printing apparatus 121 to be set. The setup program 1002 then ends the processing of this sequence diagram. The above is the description of the sequence diagram started with the information processing apparatus 101 and the printing apparatus 121 already in the communicable state on the network in the present embodiment.

In the present embodiment, the information processing apparatus 101 and the printing apparatus 121 are already in the communicable state on the network This leads to the possibility that proxy server information can be set from any information processing apparatus 101 on the network to the printing apparatus 121. With this taken into account, S1015 where the setup program 1002 connects to the printing apparatus 121 may include processing of displaying a screen to request input of an administrator's password. The setup program 1002 only needs to continue with the processing if the inputted administrator's password is determined to be valid.

As described above, according to the present embodiment, the information processing apparatus 101 can send the information on proxy server settings to the printing apparatus 121 also in a case where the information processing apparatus 101 and the printing apparatus 121 are already connected to the network. That is, even in a case of communication through their wired LAN interfaces or wireless LAN interfaces, the proxy server information settings of the information processing apparatus 101 can be transmitted to the printing apparatus 121. This can automate the work of setting proxy server information on the printing apparatus 121, which has heretofore been done manually by the user, thus reducing setting errors.

Embodiment 3

In the present embodiment, processing is started with the information processing apparatus 101 and the printing apparatus 121 connected through their respective USB interfaces and thus already in a communicable state.

Figure 12:
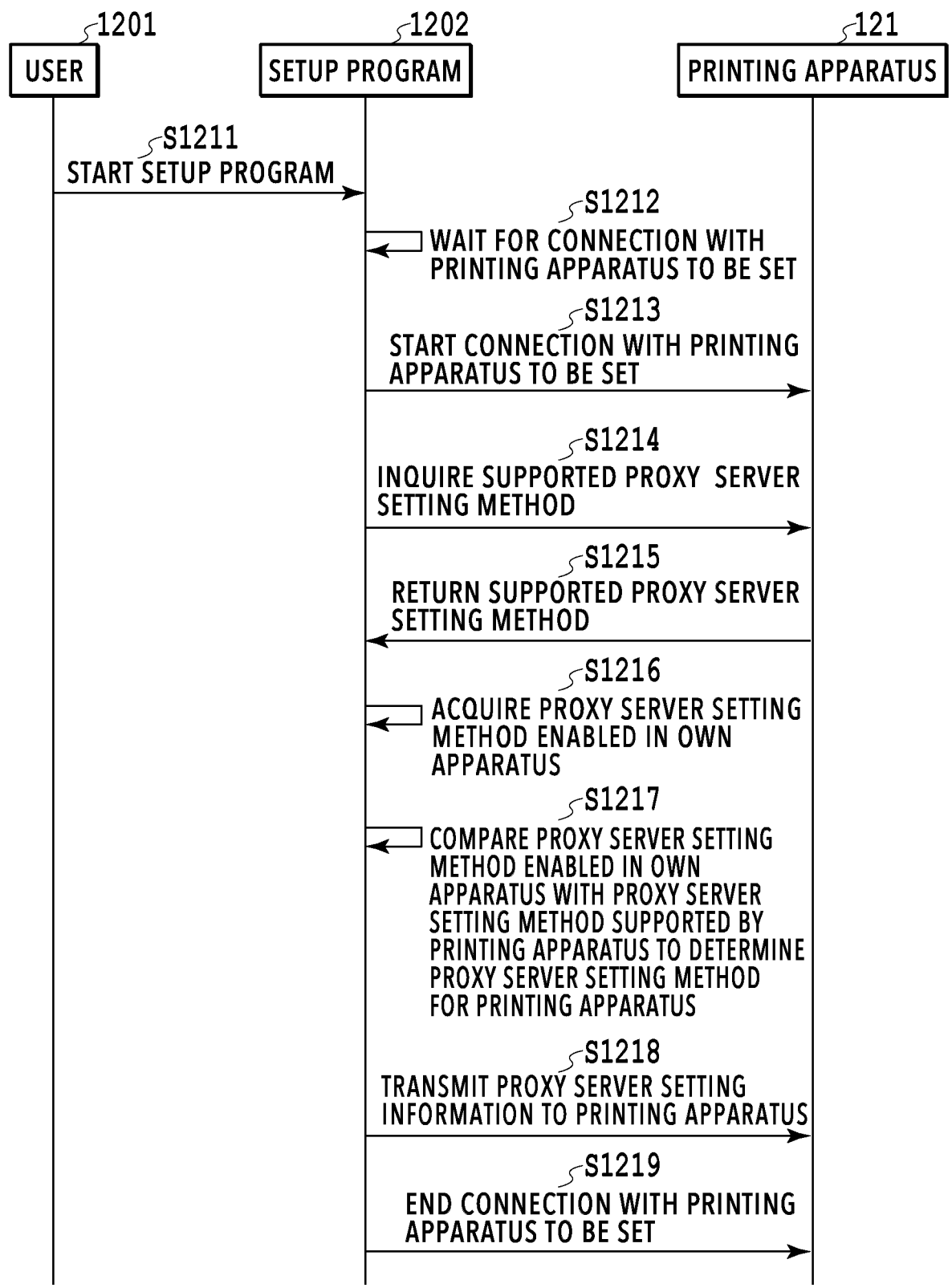
FIG. 12 is a sequence diagram of proxy server settings.

FIG. 12 is a sequence diagram according to the present embodiment. As described above, in the present embodiment, the information processing apparatus 101 and the printing apparatus 121 are connected in such a manner that their USB interfaces communicate with each other.

First, in S1211, the user instructs to start a setup program 1202 through the input interface 104 such as the keyboard 111 or mouse 112 of the information processing apparatus 101. The setup program 1202 is then read into the RAM 107 from the ROM 106 or the external storage device 103 by the CPU 102. In S1212, the setup program 1202 waits until the USB interface 129 of the printing apparatus 121 to be set is connected to the USB interface 110 of the information processing apparatus 101.

In S1213, upon detecting the connection, the setup program 1202 starts a connection with the connected printing apparatus 121. Once the connection is completed, the setup program 1202 inquires of the printing apparatus 121 in S1214 about a proxy server setting method supported by the printing apparatus 121. In S1215, the printing apparatus 121 returns the proxy server setting method supported by the printing apparatus 121 to the setup program 1202. In S1216, the setup program 1102 acquires a proxy server setting method currently enabled in the information processing apparatus 101.

In S1217, the setup program 1202 compares the proxy server setting method currently enabled in the information processing apparatus 101 with the proxy server setting method supported by the printing apparatus 121. The proxy server setting method for the printing apparatus 121 is then determined. In S1218, the setup program 1202 transmits the determined proxy server setting method to the printing apparatus 121. In S1219, the setup program 1202 performs processing for terminating the connection with the printing apparatus 121 to be set. The setup program 1202 then ends the processing of this sequence diagram.

As described above, according to the present embodiment, the proxy server setting as described in Embodiment 1 can be executed by previously connecting the information processing apparatus 101 and the printing apparatus 121 through USB connection. That is, the information processing apparatus 101 can transmit the proxy server information settings to the printing apparatus 121. This can automate the work of setting proxy server information on the printing apparatus 121, which has heretofore been done manually by the user, thus reducing setting errors.

Embodiment 4

In the present embodiment, processing in which the information processing apparatus 101 determines whether to set proxy server information for the printing apparatus 121, based on a function flag acquired from the printing apparatus 121, is added to Embodiment 1.

Figure 13:
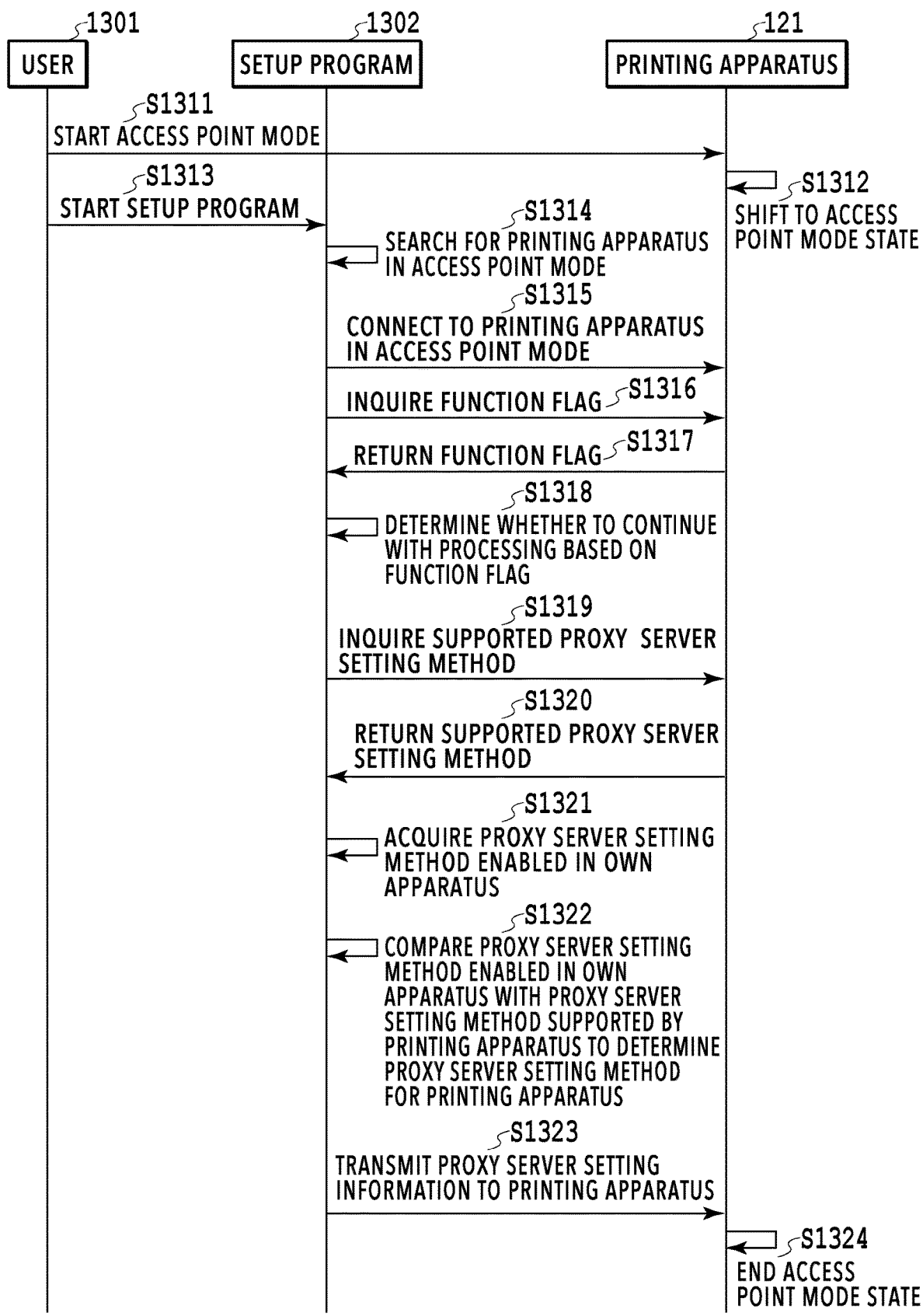
FIG. 13 is a sequence diagram of proxy server settings.

FIG. 13 is a sequence diagram according to the present embodiment. In the present embodiment, the information processing apparatus 101 and the printing apparatus 121 are connected, as in Embodiment 1, in such a manner that their wireless LAN interfaces directly communicate with each other using the access point mode function of the printing apparatus 121.

First, in S1311, the user operates the operation unit 131 of the printing apparatus 121 to instruct the printing apparatus 121 to start up in the access point mode. In S1312, upon receiving the instruction, the printing apparatus 121 activates its own access point mode. In S1313, the user instructs to start a setup program 1302 through the input interface 104 such as the keyboard 111 or mouse 112 of the information processing apparatus 101. The setup program 1302 is thus read into the RAM 107 from the ROM 106 or the external storage device 103 by the CPU 102.

In S1314, the setup program 1302 searches for the printing apparatus 121 in the access point mode. Once the detection is completed, the setup program 1302 connects to the printing apparatus 121 in the access point mode in S1315. Once the connection is completed, the setup program 1302 inquires of the printing apparatus 121 about a function flag in S1316. In S1317, the printing apparatus 121 returns the function flag of the printing apparatus 121.

FIG. 14 shows a table showing the function flags to be returned to the information processing apparatus 101 by the printing apparatus 121. A table 1401 in FIG. 14 shows three function flags: "Subscription function supported?", "Initialization incomplete?", and "Proxy server setting necessary?". The number of the function flags does not necessarily have to be three, and may be one, two, or more than three.

In S1318, the setup program 1302 refers to the function flags, and if at least one item is TRUE, determines that proxy server information needs to be set for the printing apparatus 121, and continues with the processing. On the other hand, if there is no TRUE item, it is determined that proxy server information setting is not necessary for the printing apparatus 121, and the processing is interrupted. If the setup program 1302 determines to continue with the processing, the setup program 1302 inquires of the printing apparatus 121 in S1319 about the proxy server setting method supported by the printing apparatus 121. In S1320, the printing apparatus 121 returns the proxy server setting method supported by the printing apparatus 121 to the setup program 1302.

In S1321, the setup program 1302 acquires the proxy server setting method currently enabled in the information processing apparatus 101. In S1322, the setup program 1302 compares the proxy server setting method currently enabled in the information processing apparatus 101 with the proxy server setting method supported by the printing apparatus 121. The proxy server setting method for the printing apparatus 121 is then determined. In S1323, the setup program 1302 transmits the determined proxy server settings to the printing apparatus 121. In S1324, upon receiving the proxy server settings, the printing apparatus 121 ends the access point mode and shifts to an idle state.

As described above, according to the present embodiment, the information processing apparatus 101 refers to the function flag indicating whether proxy server settings are required in the printing apparatus 121. This makes it possible to transmit the settings for proxy server information of the information processing apparatus 101 to the printing apparatus 121 when the settings are required. This can reduce the chances of the user unnecessarily getting involved with the settings, and can automate the work of setting proxy server information on the printing apparatus 121, which has heretofore been done manually, thus reducing setting errors.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-008933, filed Jan. 24, 2023, which is hereby incorporated by reference herein in its entirety.

What is claimed is:

1. An information processing apparatus comprising at least one memory and at least one processor and/or at least one circuit which function as:
a first acquisition unit that acquires first setting information including at least one piece of information indicating a proxy server setting method enabled in the information processing apparatus;
a second acquisition unit that acquires second setting information including at least one piece of information indicating a proxy server setting method supported by an external apparatus;
a determination unit that determines whether or not there is a same setting method in the first setting information and the second setting information; and
a transmission unit that transmits, in a case where the determination unit determines there is the same setting method, all information indicating the same setting method to the external apparatus,
wherein if it is determined there is no same setting method, the determination unit further determines whether or not the proxy server setting method enabled in the information processing apparatus, which is included in the first setting information, can be converted to any one of the second setting information supported by the external apparatus, and
if it is determined that conversion is possible, the transmission unit transmits information obtained by converting the first setting information to the second setting information to the external apparatus.

2. The information processing apparatus according to claim 1, wherein
the determination unit makes the determination by referring to a table that associates the first setting information with the second setting information.

3. The information processing apparatus according to claim 1, further comprising:

a display control unit that controls display of a settings screen for receiving the proxy server settings by a user when the determination unit determines that conversion is not possible.

4. The information processing apparatus according to claim 3, wherein
the transmission unit transmits the proxy server settings set on the settings screen to the external apparatus.

5. The information processing apparatus according to claim 1, wherein
the second acquisition unit acquires the second setting information in advance from a server in charge of the external apparatus.

6. The information processing apparatus according to claim 1, wherein
the information processing apparatus and the external apparatus are connected through wireless connection, wired connection, and USB connection.

7. The information processing apparatus according to claim 1, wherein
the external apparatus is a printing apparatus.

8. The information processing apparatus according to claim 1, wherein
the first setting information and the second setting information each include a setting method using an automatic configuration script, a setting method for automatically detecting the proxy server, and a setting method for manually setting the proxy server by a user.

9. A non-transitory computer readable storage medium storing a program which functions in an information processing apparatus for setting a proxy server of an external apparatus and causes the information processing apparatus to function as:
a first acquisition unit that acquires first setting information including at least one piece of information indicating a proxy server setting method enabled in the information processing apparatus;
a second acquisition unit that acquires second setting information including at least one piece of information indicating a proxy server setting method supported by an external apparatus;
a determination unit that determines whether or not there is a same setting method in the first setting information and the second setting information; and
a transmission unit that transmits, in a case where the determination unit determines there is the same setting method, all information indicating the same setting method to the external apparatus,
wherein if it is determined there is no same setting method, the determination unit further determines whether or not the proxy server setting method enabled in the information processing apparatus, which is included in the first setting information, can be converted to any one of the second setting information supported by the external apparatus, and
if it is determined that conversion is possible, the transmission unit transmits information obtained by converting the first setting information to the second setting information to the external apparatus.

10. A method for controlling an information processing apparatus, comprising:
a first acquisition step of acquiring first setting information including at least one piece of information indicating a proxy server setting method enabled in the information processing apparatus;

a second acquisition step of acquiring second setting information including at least one piece of information indicating a proxy server setting method supported by an external apparatus;

a determination step of determining whether or not there is a same setting method in the first setting information and the second setting information; and a transmission step of transmitting, in a case where it is determined in the determination step there is the same setting method, all information indicating the same setting method to the external apparatus, wherein if it is determined there is no same setting method, it is further determined whether or not the proxy server setting method enabled in the information processing apparatus, which is included in the first setting information, can be converted to any one of the second setting information supported by the external apparatus, and if it is determined that conversion is possible, information obtained by converting the first setting information to the second setting information is transmitted to the external apparatus.

* * * * *